United States Patent Office 2,856,406
Patented Oct. 14, 1958

2,856,406

AMINOACID ESTERS OF N-SUBSTITUTED HYDROXYALKYL PIPERIDINES

John H. Biel, Milwaukee, Wis., assignor to Lakeside Laboratories, Inc., a corporation of Wisconsin No Drawing. Application August 8, 1956
Serial No. 602,917

7 Claims. (Cl. 260—247.2)

This invention relates to hydroxyalkyl piperidines. More particularly, this invention is concerned with novel aminoacid esters of hydroxyalkyl piperidines and methods of producing such compounds.

I have discovered and provide by this invention novel N,N-disubstituted amino lower monocarboxylic acid esters of N-substituted hydroxyalkyl piperidines of the formula

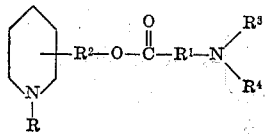

and acid addition and quaternary ammonium salts thereof, wherein R is an alkyl group, preferably a lower alkyl group, or an aralkyl group, preferably of the lower alkyl-monocyclic aryl type, $R^1$ and $R^2$ are the same or different lower alkylene groups, preferably of less than four carbons, and $R^3$ and $R^4$ are the same or different alkyl groups, preferably lower alkyls, aryl groups, preferably monocyclic aryl groups such as the phenyl group, aralkyl groups, preferably lower alkyl-monocyclic aryl groups like benzyl and phenethyl groups, lower alkene groups such as the allyl group and groups in which $R^3$ and $R^4$ are joined to form a heterocyclic ring, preferably of 5 or 6 atoms in the ring, such as pyrrolidino, piperidino and morpholino.

Compounds of the above formulae may be conveniently prepared as the free base by reacting an ester of the amino acid with the N-substituted hydroxyalkyl piperidine. This reaction may be represented as follows:

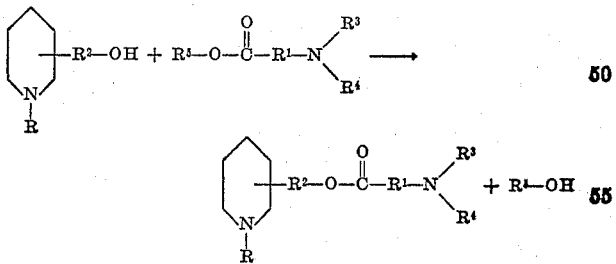

wherein R, $R^1$, $R^2$, $R^3$ and $R^4$ have the significance previously assigned and $R^5$ is a hydrocarbon group, preferably a lower alkyl group.

Some N-substituted hydroxyalkyl piperidines which may be employed as starting materials are N-methyl-2-hydroxymethyl piperidine, N-ethyl-3-(2-hydroxyethyl)piperidine, N-propyl-4-(2-hydroxyethyl)piperidine, N-benzyl-3-(3-hydroxypropyl)piperidine, N-phenethyl-2-(4-hydroxybutyl)piperidine and the like.

Typical aminoacids which may be used, as esters, in the reaction are 3-morpholinopropionic acid, 3-pyrrolidinopropionic acid, 3-piperidinopropionic acid, 2-dimethylaminoacetic acid, 3-dimethylaminopropionic acid, 4-dipropylaminobutyric acid, diphenylaminoacetic acid, 5-dibenzylaminovaleric acid and the like. Lower alkyl esters of these compounds may be used in the reaction, and preferably the methyl and ethyl esters.

The reaction is conveniently carried out by contacting an ester of the aminoacid with the N-substituted hydroxyalkyl piperidine in the presence of an inert solvent such as n-heptane, methylcyclohexane or xylene. A small amount of an alkali metal alkoxide, such as sodium methoxide, is generally added to catalyze the reaction. About equimolar quantities of the reactants are preferably used. Elevated temperatures such as the reflux temperatures are generally used. By removing the alcohol by-product formed in the reaction, it is induced to go to completion within a minimum of time. After the theoretical amount of alcohol is collected the reaction is considered completed. The desired product may be conveniently recovered by conventional means such as by fractional distillation.

Some of the novel compounds that are produced in this way are N-methyl-2-piperidylmethyl-3'-morpholinopropionate, N-methyl-3-piperidylmethyl-2'-dimethylaminoacetate, N-benzyl-4-piperidylethyl-2'-pyrrolidinoacetate, N-phenethyl-2-piperidylpropyl-4'-piperidinobutyrate, N-ethyl-3-piperidylethyl-3'-morpholinopropionate, N-propyl-4-piperidylmethyl-3'-pyrrolidinopropionate and the like.

Acid addition salts of these and other such compounds as are included within the scope of this invention may be produced by contacting the compound with a suitable acid such as a mineral acid like sulfuric acid or hydrochloric acid, or organic acids like maleic acid, fumaric acid, acetic acid or citric acid.

Quaternary ammonium salts may also be readily prepared by contacting the compounds with alkyl and aralkyl esters of mineral and organic acids, preferably in the presence of a suitable organic solvent. Alkyl halides such as methyl bromide, ethyl iodide, methyl sulfate, benzyl chloride and propargyl bromide are representative compounds that may be used to form quaternary ammonium salts.

The novel compounds of this invention in the form of free bases or non-toxic acid addition salts are useful diuretic agents. The quaternary ammonium salts are potent, long-lasting hypotensive agents.

The following examples illustrate specific embodiments of the invention, but it is to be understood that these examples are for illustration only and are not to be considered as restricting the invention.

Example 1

N - methyl - 2 - piperidylmethyl - 3' - morpholinopropionate, having the structure:

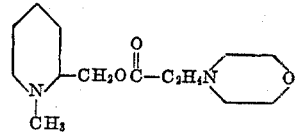

A mixture containing 32.7 g. (0.24 mole) of N-methyl-2-hydroxymethylpiperidine, 41.5 g. (0.24 mole) of methyl morpholinopropionate, 1.2 g. of sodium methoxide and 325 cc. of n-heptane was refluxed with stirring. The methanol separated as soon as it was formed. After all the methanol had been collected the solvent was removed by distillation and the product separated by fractional distillation, B. P. 140–141° C./0.8 mm., yield 45 g. (69%).

*Analysis.*—Calcd. for $C_{14}H_{26}N_2O_3$: N, 10.37. Found: N, 10.16.

Example 2

N - methyl-2-piperidylmethyl-3'-morpholinopropionate bis-methobromide. To a solution of 10.8 g. (0.04 mole)

of the base (Example 1) in 60 cc. of isopropyl alcohol was added 15.2 g. (0.16 mole) of methyl bromide and the resulting mixture refluxed for 3 hours. A solid precipitated which was separated by filtration and recrystallized from ethyl alcohol, M. P. 188–189° C.; yield 14 g. (73%).

*Analysis.*—Calcd. for $C_{16}H_{32}Br_2N_2O_3$: Br, 34.78; N, 6.09. Found: Br, 35.19; N, 6.14.

Example 3

N - methyl - 3 - piperidylmethyl-N',N'-dimethylaminoacetate dimaleate:

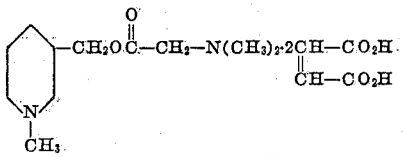

The basic ester was prepared as shown in Example 1 by reacting N-methyl-3-hydroxymethylpiperidine with methyl N,N-dimethylaminoacetate; 147–148° C./22 mm.; $N_D^{25}$ 1.4622. It was converted to the dimaleate salt in isopropyl alcohol, M. P. 73–74° C.

The bis-methobromide salt was also prepared; M. P. 232–233° C. dec.

Various changes and modifications of the invention can be made and, to the extent that such variations incorporate the spirit of this invention, they are intended to be included within the scope of the appended claims.

What is claimed is:

1. A member of the group consisting of compounds essentially of the formula

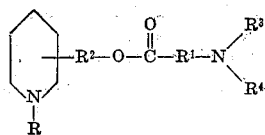

and non-toxic acid addition and quaternary ammonium salts thereof, wherein R is a member of the group consisting of lower alkyl and phenyl-lower alkyl groups, $R^1$ and $R^2$ are lower alkylene groups, and $R^3$ and $R^4$ are members of the group consisting of lower alkyl groups, phenyl groups, phenyl-lower alkyl groups, lower alkene groups, and groups in which $R^3$ and $R^4$ are joined to form a monocyclic heterocyclic group of the group consisting of the morpholino, piperidino and pyrrolidino groups.

2. N',N'-di-lower alkylamino acyloxy-(N-lower alkyl-piperidyl)-lower alkanes.

3. N - methyl - 2 - piperidyl-methyl-3'-morpholinopropionate.

4. N - methyl - 2 - piperidyl-methyl-3'-morpholinopropionate methobromide.

5. N - methyl - 3 - piperidyl-methyl-N',N'-dimethylaminoacetate.

6. N - methyl - 3 - piperidyl-methyl-N',N'-dimethylaminoacetate maleate.

7. The process which comprises reacting a compound of the formula

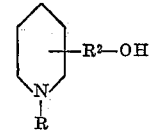

with a compound of the formula

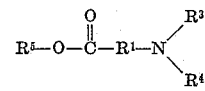

to produce a compound of the formula

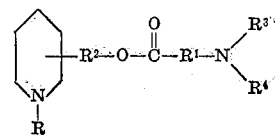

wherein $R^5$ is a lower alkyl group, R is a member of the group consisting of lower alkyl and phenyl-lower alkyl groups, $R^1$ and $R^2$ are lower alkylene groups, and $R^3$ and $R^4$ are members of the group consisting of lower alkyl groups, phenyl groups, phenyl-lower alkyl groups, lower alkene groups, and groups in which $R^3$ and $R^4$ are joined to form a monocyclic heterocyclic group of the group consisting of the morpholino, piperidino and pyrrolidino groups.

References Cited in the file of this patent

UNITED STATES PATENTS 2,536,079     Papa  ---------------- Jan. 2, 1951